US009057460B2

(12) United States Patent
Ismert et al.

(10) Patent No.: US 9,057,460 B2
(45) Date of Patent: Jun. 16, 2015

(54) PLUMBING SUPPLY LINE AND DRAIN LINE MOUNTING AND FINISH PANEL

(75) Inventors: Brian E. Ismert, Lone Jack, MO (US); Joseph P. Ismert, Kansas City, MO (US)

(73) Assignee: SIOUX CHIEF MFG. CO., INC., Peculiar, MO (US)

(*) Notice: Subject to any disclaimer, the term of this patent is extended or adjusted under 35 U.S.C. 154(b) by 1067 days.

(21) Appl. No.: 13/096,093

(22) Filed: Apr. 28, 2011

(65) Prior Publication Data
US 2012/0273064 A1 Nov. 1, 2012

(51) Int. Cl.
*E03C 1/02* (2006.01)
*F16L 5/14* (2006.01)
*F16L 5/10* (2006.01)
*E03C 1/12* (2006.01)

(52) U.S. Cl.
CPC ... *F16L 5/14* (2013.01); *F16L 5/10* (2013.01); *E03C 1/021* (2013.01); *E03C 1/12* (2013.01); *E03C 2001/028* (2013.01)

(58) Field of Classification Search
CPC ............... F16L 5/10; F16L 5/14; E03C 1/12; E03C 1/021; E03C 2001/028
USPC ........... 137/360; 312/229, 242; 4/695; 52/34, 52/35
See application file for complete search history.

(56) References Cited

U.S. PATENT DOCUMENTS

| 2,295,888 | A | | 9/1942 | Bucknell et al. | |
|---|---|---|---|---|---|
| 3,009,167 | A | | 11/1961 | Leonard, Jr | |
| 3,847,175 | A | * | 11/1974 | Anderson | 137/360 |
| 4,420,022 | A | * | 12/1983 | Landry | 137/382 |
| 4,564,249 | A | | 1/1986 | Logsdon | |
| 5,309,579 | A | | 5/1994 | Nelson | |
| 5,423,345 | A | * | 6/1995 | Condon et al. | 137/360 |
| 5,653,254 | A | | 8/1997 | Condon et al. | |
| 5,755,247 | A | | 5/1998 | Condon | |
| 6,129,109 | A | | 10/2000 | Humber | |
| 6,234,193 | B1 | | 5/2001 | Hobbs et al. | |
| 6,543,186 | B2 | | 4/2003 | Gilleran | |
| 6,698,103 | B2 | | 3/2004 | Nortier et al. | |
| 6,845,785 | B1 | | 1/2005 | Condon | |
| 6,860,070 | B2 | | 3/2005 | Gilleran | |
| 6,948,517 | B2 | * | 9/2005 | Fukano et al. | 137/312 |
| 7,204,267 | B1 | | 4/2007 | Persico | |
| 7,357,148 | B1 | | 4/2008 | Gibson | |
| 7,614,419 | B2 | | 11/2009 | Minnick | |
| 2005/0067017 | A1 | | 3/2005 | Condon et al. | |
| 2010/0000614 | A1 | | 1/2010 | Zahuranec et al. | |

OTHER PUBLICATIONS

Advertisement for a quick plug trap adapter test plug on sale more than one year prior to the filing date of the present application, 2002.

* cited by examiner

*Primary Examiner* — Eric Keasel
(74) *Attorney, Agent, or Firm* — Erikson Kernell Derusseau & Kleypas, LLC

(57) ABSTRACT

A plumbing finish plate assembly, for connecting water supply lines and a drain line in a wall to fixture supply and drain lines, comprises a mounting panel having a drain line opening and two supply line openings formed therethrough. The drain line opening is larger than the supply line openings and a flexible, annular seal is secured around the drain line opening. A supply line connector assembly is securable to the mounting panel through each supply line opening. A securement means, in the form of a clip is used to selectively secure the supply line connector assembly to the mounting panel such that an outlet leg of the connector assembly is oriented in at least ninety degree increments relative to the mounting panel.

10 Claims, 8 Drawing Sheets

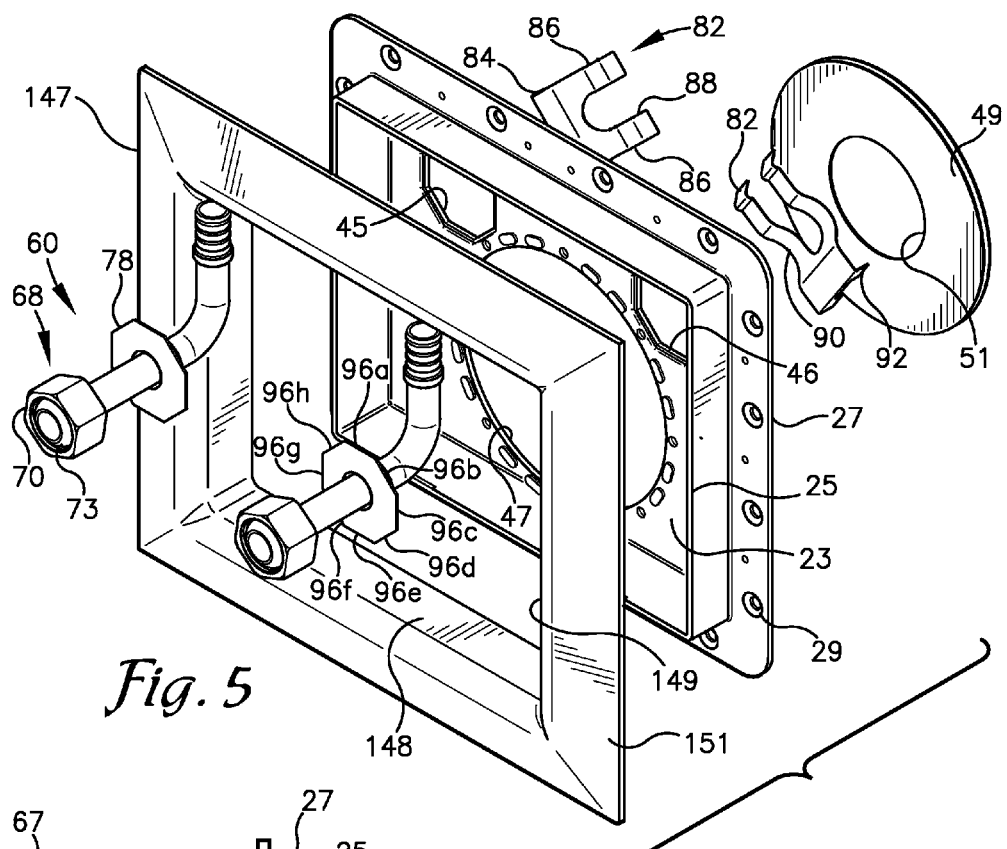
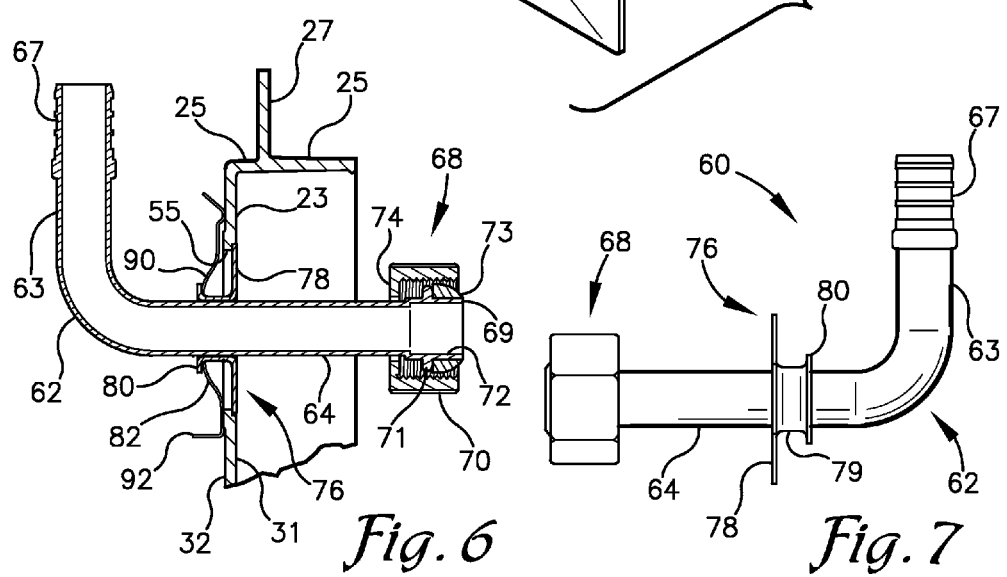

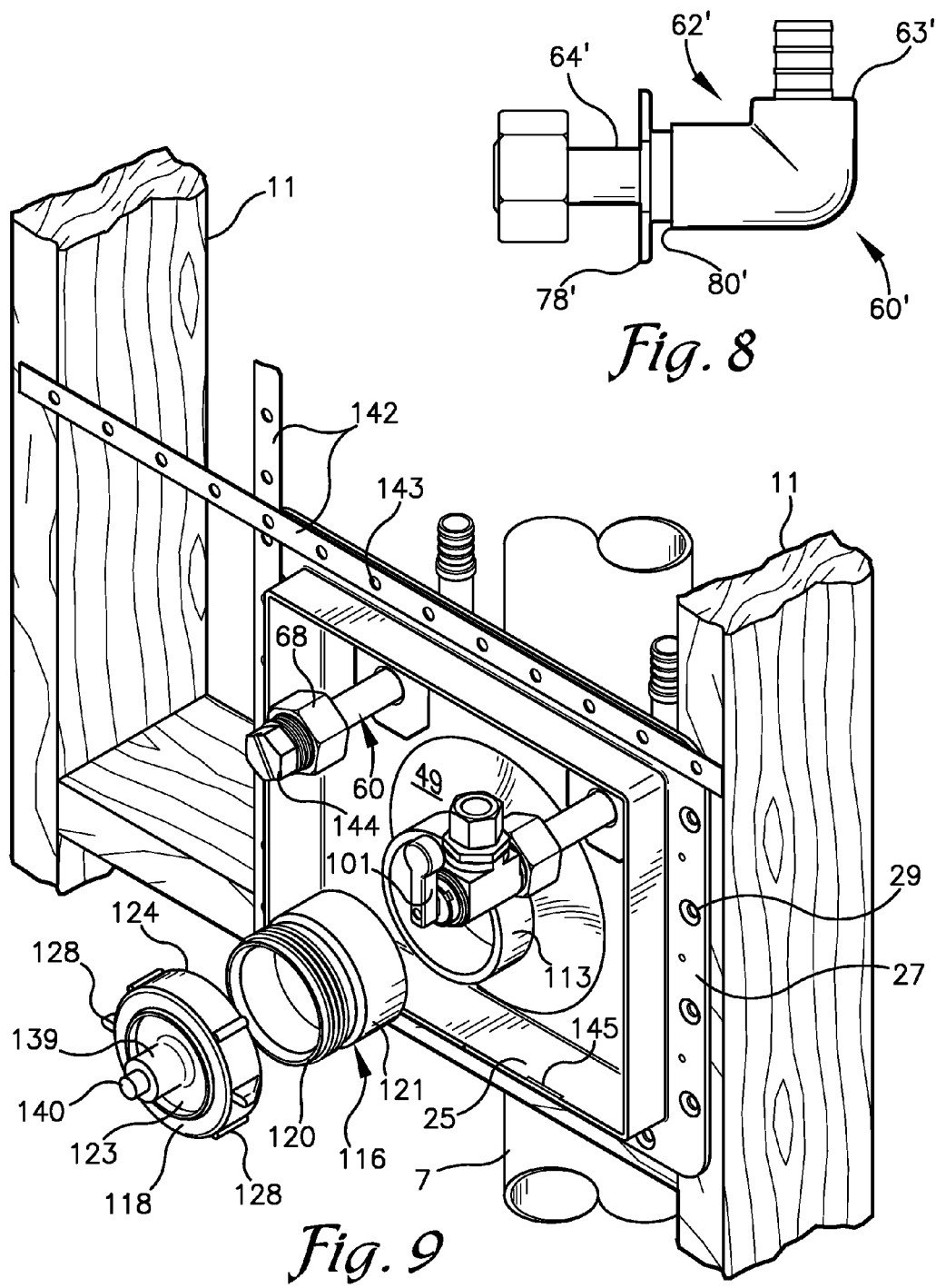

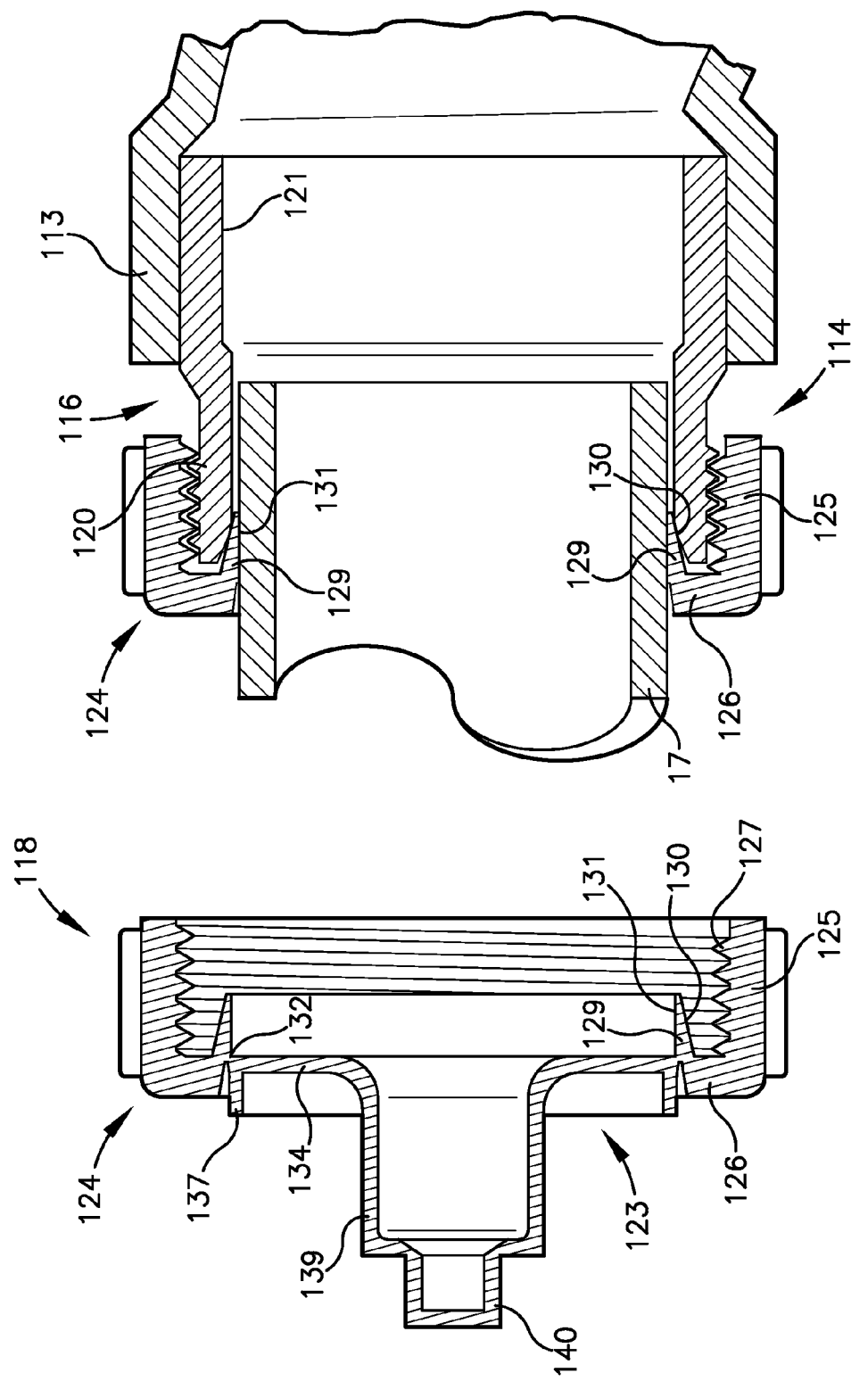

US 9,057,460 B2

PLUMBING SUPPLY LINE AND DRAIN LINE MOUNTING AND FINISH PANEL

BACKGROUND OF THE INVENTION

1. Field of the Invention

This invention relates to apparatus for attaching or connecting water supply lines and drain lines to a wall structure and which provides an acceptable finished appearance while sealing the opening around the drain line as well as the supply line.

2. Description of the Related Art

Tying in supply lines and the drain line for sinks or lavatories in a stud wall can be a difficult and time consuming exercise, particularly where the connection of the supply and drain lines through the wall are exposed beneath the sink. A wide variety of brackets, straps and the like are available for supporting and holding hot and cold water supply lines within a stud bay at the location where the supply lines will extend through holes formed in dry wall attached over the studs forming the stud wall. The branch of a drain line to which the sink drain is to be connected is typically self-supported off of a vertically extending drain line.

Finishing a wall around the drain line can prove difficult and time consuming, particularly if the drain line is stubbed out through the wall at an angle other than ninety degrees relative to the wall. In such circumstances, the dry-wall installer is required to make a relatively large hole to accommodate the angled length of drain line, requiring more repair work after the dry wall is secured to the stud wall. The installer then typically places separate escutcheons around each supply line and drain line and over the respective openings through the drywall to cover any gaps therebetween.

Finish boxes have been developed which include openings for tying in supply lines and a drain line through a wall panel and which present a relatively clean appearance to the wall once dry wall is mounted over the box. U.S. Pat. No. 5,653,254 to Condon discloses such a box. The box includes a floor panel with two openings which, when the box is mounted as intended in a stud wall, extend through the floor panel generally perpendicular to the vertical opening into the box. A sleeve, through which a drain line elbow may extend, is formed in a back panel of the box and extends forward therefrom. The sleeve extends above the bottom panel and the supply line openings extending therethrough. Quarter turn or angle stop valves are mounted to the bottom panel with a pipe connection shank extending vertically below the bottom panel.

Although the orientation of the box can be changed to accommodate variations in the direction that the water supply lines and the drain line are plumbed to the box, the variations are limited. The box can generally be oriented in one of only four orientations, with the floor panel below the drain sleeve and the pipe connection shanks extending downward, with the floor panel above the drain sleeve and the pipe connection shanks extending upward, with the floor panel to the left of the drain sleeve and the pipe connection shanks extending to the left and with the floor panel to the right of the drain sleeve and the pipe connection shanks extending to the right. Correspondingly, the supply lines and the drain line generally have to be plumbed in one of four orientations. There are numerous instances where due to the direction from which the supply lines and the drain line are plumbed, that use of the box taught in the Condon '254 patent is not usable.

In addition, in boxes such as are taught by Condon '254, it is very difficult to fit tools into the box to try to remove and replace the valve body if it develops a leak or otherwise fails. Then once a new valve is obtained, it becomes difficult to install the valve by threading it onto a threaded receiver in the box while getting the supply line outlet of the valve to face forward without over or under tightening the valve body to the threaded receiver or without damaging the supply line connected thereto past the floor panel.

There remains a need for a finish plate system or the like which can accommodate a wide variety of situations regarding the location of supply lines and the drain line and which permits ready removal and replacement of supply line valves.

SUMMARY OF THE INVENTION

A plumbing finish plate assembly, for covering an opening in a wall panel through which water supply lines and a drain line extend, comprises a mounting panel having a drain line opening and two supply line openings formed therethrough. The drain line opening is larger in diameter than the supply line openings and a flexible, annular drain line seal is connected to and secured around the drain line opening for sealing around a drain pipe extending through the drain line opening. A supply line connector assembly is securable to the mounting panel through the supply line opening. The connector assembly comprises an elbow having an inlet supply line connector on an inlet end of an inlet leg thereof and an outlet supply line connector on an outlet end of an outlet leg thereof. The inlet leg extends generally perpendicular to the outlet leg. A securement means, in the form of a clip is used to selectively secure the supply line connector assembly to the mounting panel such that the outlet leg of the elbow extends through the supply line opening and the supply line connector assembly is oriented in at least ninety degree increments relative to the mounting panel. The supply line connector assembly can be used in association with a mounting panel having one or more supply line openings, either alone or in combination with a drain line opening.

BRIEF DESCRIPTION OF THE DRAWINGS

FIG. 5 is an exploded, perspective view of the supply line and drain line access panel assembly.

FIG. 6 is an enlarged and fragmentary, cross-sectional view of the access panel assembly taken along line 6-6 of FIG. 4, showing a supply line connector assembly connected to the mounting panel by a clip.

FIG. 7 is a side plan view of the supply line connector assembly as shown in FIG. 4.

FIG. 8 is an alternative embodiment of the supply line connector assembly as shown in FIG. 7.

FIG. 9 is an exploded, fragmentary, perspective view of the access panel assembly shown secured to studs in a stud wall prior to connection of supply lines thereto and prior to connection of a drain line for a plumbing fixture thereto, showing a plug connected to the outlet of one of the supply line connector assemblies, a valve connected to the outlet of the other supply line connector assembly and a trap adaptor assembly connected to the hub of a drain line tee.

FIG. 10 is an enlarged cross-sectional view of a cap for the trap adaptor assembly as shown in FIG. 9.

FIG. 11 an enlarged and fragmentary cross-sectional view showing a knock-out of the trap adaptor cap removed and the remaining portion of the cap connecting a fixture drain pipe to a stub-out of the trap adaptor which is glued into the drain line tee hub.

DETAILED DESCRIPTION OF THE PREFERRED EMBODIMENTS

Figures 1, 2:
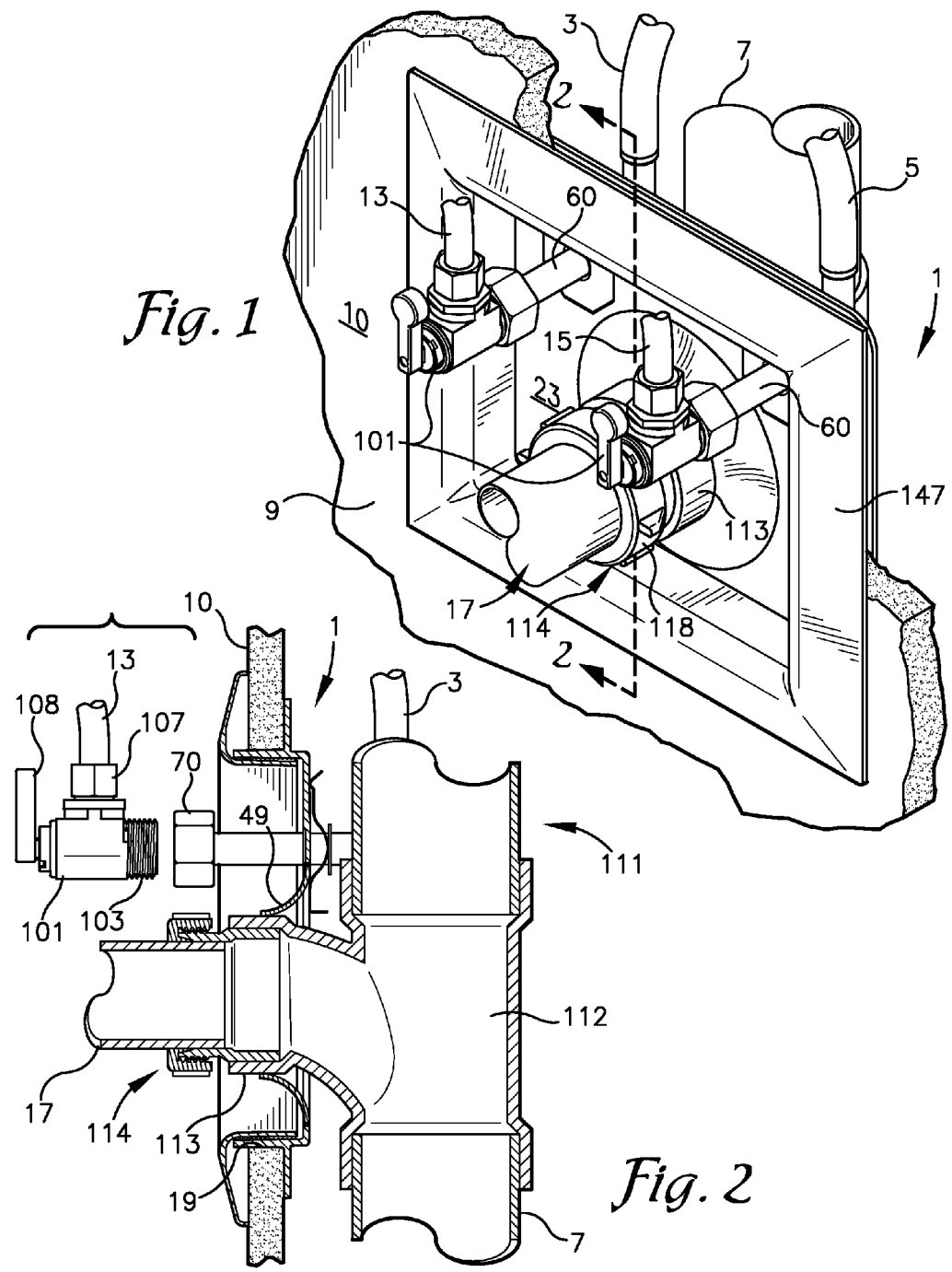
FIG. 1 is a fragmentary perspective view of supply and drain line access panel assembly including a mounting panel for covering an opening in a wall through which water supply lines and a drain line extend for connection to water supply lines and a drain line for a fixture such as a sink.
FIG. 2 is an enlarged and fragmentary, exploded, cross-sectional view taken along line 2-2 of FIG. 1.
Figure 3:
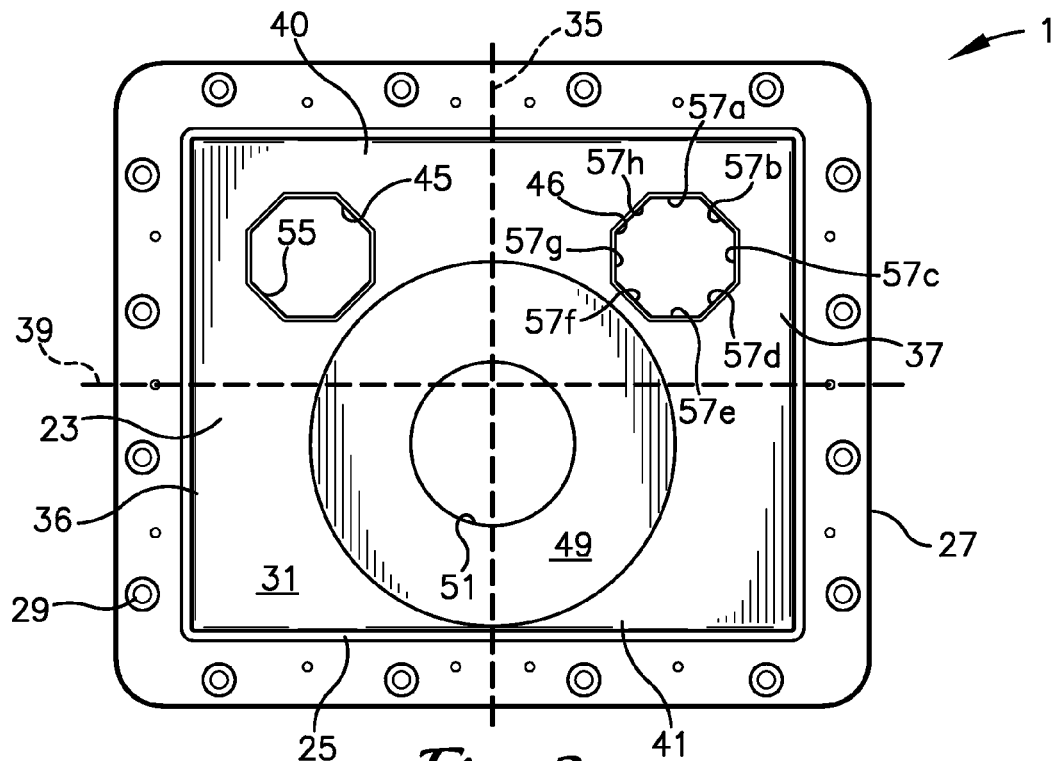
FIG. 3 is a front plan view of the mounting panel having a pair of supply line openings and a drain line opening with an elastomeric seal secured around the drain line opening.
Figure 4:
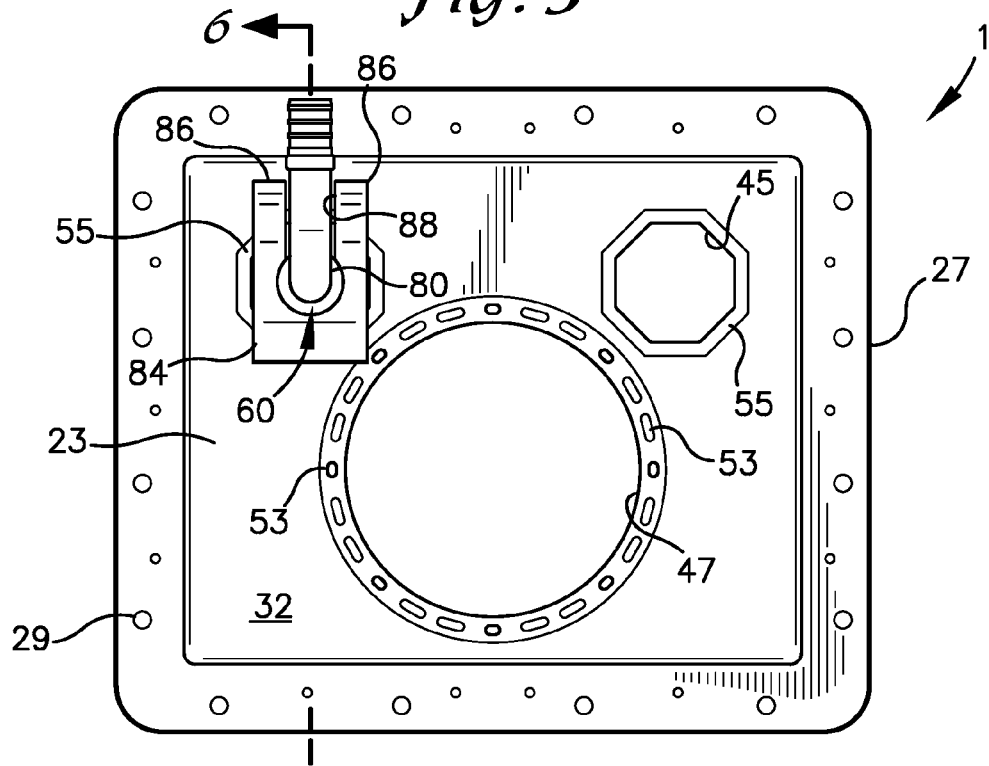
FIG. 4 is a rear plan view of the mounting panel showing a supply line connector assembly secured in one of the supply line opening and a second supply line opening open and having an elastomeric seal removed from around the drain line opening.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. The drawings constitute a part of this specification and include exemplary embodiments of the present invention and illustrate various objects and features thereof.

Certain terminology will be used in the following description for convenience in reference only and will not be limiting. For example, the words "upwardly," "downwardly," "rightwardly," and "leftwardly" will refer to directions in the drawings to which reference is made. The words "inwardly" and "outwardly" will refer to directions toward and away from, respectively, the geometric center of the embodiment being described and designated parts thereof. Said terminology will include the words specifically mentioned, derivatives thereof and words of a similar import.

Referring to the drawings in more detail, the reference numeral 1 refers to a supply and drain line access panel assembly for providing access to hot and cold water supply lines 3 and 5, respectively, and to a drain line 7 located in a wall 9 to facilitate connection to a plumbing fixture such as a sink (not shown). The wall 9 is expected to be constructed in the traditional fashion with wallboard 10 fastened to spaced apart wall studs 11 (see FIG. 9), including either wood or metal studs 11. The supply and drain line access panel assembly 1 facilitates connection of hot and cold supply lines 13 and 15 for the sink to the supply lines 3 and 5 within the wall 9. The access panel assembly 1 also allows coupling of a drain line 17 for the sink with the drain line 7 in the wall 9 through the finish plate 1. The access panel assembly 1 may also be referred to as a finish plate as it functions to cover a hole formed in the wallboard 10 to permit the above noted connections.

The finish plate 1, which is preferably formed from molded, relatively rigid plastic, includes a back panel or main panel 23, a circumferential wall or rim 25 circumscribing and projecting perpendicular and forward from the main panel 23. A mounting flange 27 extends transverse to and circumscribes the circumferential rim 25 in slightly spaced relation forward from the back panel 23, such that a portion of the rim 25 extends rearward from the mounting flange 27 and a portion of the rim 25, having a depth approximately equal to the thickness of conventional wallboard, projects forward from the mounting flange 27. A plurality of fastener receiving holes 29 are formed in the mounting flange 27, through which fasteners may be driven for securing the finish plate 1 to a stud 11 or other support structure. Although the mounting flange 27 is show as continuous, it is to be understood that the mounting flange 27 could comprise a plurality of discontinuous mounting flanges projecting outward from or transverse to the rim 25.

The back panel 23 is preferably rectangular and includes front and rear faces 31 and 32. A first centerline 35 extends between first and second sides 36 and 37 of back panel 23 and a second centerline 39 extends between third and fourth sides 40 and 41 of back panel 23.

A pair of supply line openings 45 and 46 and a drain line opening 47 are formed in and extend through the back panel 23. An annular, elastomeric seal 49 is over-molded onto or otherwise secured to the back panel 23 over and around the drain line opening 47. The seal 49 includes a central opening or aperture 51 that is smaller than the drain line opening 47. An edge of the back panel 23 surrounding the drain line opening 47 preferably includes molded in surface anomalies 53, such as ridges, grooves, indentations, openings and the like to improve adherence of the over-molded elastomeric material to the plastic back panel 23.

In an exemplary embodiment, the drain line opening 47 is approximately three and one half inches in diameter and the central opening 51 of the seal 49 is approximately two and one half inches in diameter. The drain line opening 47 preferably is centered on the first centerline 35 between first and second sides 36 and 37 of the back panel 23 and offset toward one of the third or fourth sides 40 or 41 of the back panel 23. The supply line openings 45 and 46 are spaced apart on opposite sides of the first centerline 35 with both positioned on one side of the second centerline 39, on the side opposite the drain line opening 47.

In the embodiment shown, each supply line opening 45 and 46 is octagonal in shape, with eight sides, and includes a shoulder or lip 55 molded onto the back panel 23 and projecting into the respective supply line opening 45 and 46 such that the width of the opening across the front face 31 is slightly wider than the opening across the rear face 32. Each supply line opening 45 and 46 is preferably oriented such that two of the edges (such as edges 57a and 57e) of each opening extend parallel to the third and fourth sides 40 and 41 of the back panel 23 and two other edges (such as edges 57c and 57g) extend parallel to the first and second sides 35 and 36.

As best seen in FIGS. 5-7, a supply line connector assembly 60 is securable to said mounting panel 1 through each of the supply line openings 45 and 46. Each said supply line connector assembly 60 comprises a length of conduit 62 formed into an elbow having an inlet leg 63 and an outlet leg 64. An inlet connector 67 is formed or otherwise connected to or mounted on an inlet end of the inlet leg 63 and an outlet connector 68 is formed on or otherwise connected to or mounted on an outlet end of the outlet leg 64. In the embodiment shown, the conduit 62 is formed from copper and the inlet connector 67 comprises a ribbed nipple type connector for connecting flexible PEX conduit thereto. It is foreseen that a wide variety of other connectors could be used, such as a socket or hub formed by widening the inlet end of the conduit (as with the embodiment shown in FIGS. 16-19). The outlet connector 68 shown comprises a male connector member 69 formed on the end of the outlet leg in combination with a nut 70 positioned around the outlet leg 64. The male connector member 69 includes a circumferential extending ridge or abutment 71 surrounding the tip 72 of the conduit 62 around which an annular and tapered, elastomeric sealing member 73 is positioned. The nut 70 is positioned between the abutment 71 and a mounting flange assembly 76 secured around the outlet leg 64 of conduit 62 of each supply line connector assembly 60. The nut 70 is internally threaded and includes an inwardly projecting shoulder or lip 74 extending across the internally threaded bore of the nut 70 on a side opposite or rearward from the male member abutment 71. The shoulder 74 reduces the diameter of the bore through the nut 71 to a diameter less than the diameter of the abutment so that the nut 70 does not slide past the abutment 71. The nut 70 is slid onto the outlet leg 64 prior to formation of one or both of the inlet connector 67 or the abutment 71 on the outlet connector 68 and prior to securement of a mounting flange assembly 76 to the outlet leg 64.

Each mounting flange assembly 76 includes a position orientation flange 78, a crimp collar 79 and a retention flange 80. The position orientation flange 78 and retention flange 80 project radially outward from the crimp collar 79 in spaced relation. The crimp collar 64 is slid over and crimped onto the conduit 62 prior to forming one or both of the inlet and outlet connectors 67 and 68.

The position orientation flange 78 is octagonal and projects transverse to or radially outward from outlet leg 64. The position orientation flange 78 is sized for mating reception in one of the supply line openings 45 or 46 in abutting relationship against the shoulder 55. The retention flange 80 is spaced rearwardly from the position orientation flange 78 and is engageable by a retention clip 82 for securing or holding the supply line connector assembly 60 to the back panel 23.

The retention clip 82, in the embodiment shown, is formed of spring steel and includes a tab 84 and two legs 86 projecting outward therefrom in spaced apart relation with a slot or gap 88 extending between the legs 86. The gap 88 is sized to receive the crimp collar 79 such that the legs 86 of clip 82 can be slid around the crimp collar 79 and conduit 62 between a rear surface of the shoulder 55 of back panel 23 and a forward surface of the retention flange 80 when the position orientation flange 78 of connector assembly 60 is positioned in the supply line opening 45 or 46. The legs 86 of clip 82 preferably are bowed near the trough of the gap 88 so that when the clip 82 is secured between the retention flange 80 and the back panel 23 the bowed portions 90 engage the retention flange 80 and urge the connector assembly 60 rearward such that the position orientation flange 78 is securely seated against the shoulder 55 in the supply line opening 45 or 46. A grip 92 is formed in the clip 82, extending generally perpendicular to the legs 86 to facilitate insertion and removal of the clip 82.

The position orientation flange 78 is secured to the outlet leg 64 of the conduit 62 so that the inlet leg 63 extends approximately perpendicular to and in overlapping relation to one of the edges, such as edge 96a, of the position orientation flange 78. Because the inlet leg 63 extends perpendicular to an edge 96a of the position orientation flange 78, and because edge 57a of the either supply line opening 45 or 46 is parallel to third and fourth edges 40 and 41 of the back panel 23, respectively, when position orientation flange 78 is oriented with edge 96a in alignment with and abutting edge 57a of the supply line opening 45 or 46, the inlet leg 63 extends perpendicular to the third and fourth edges 40 and 41 of the back panel 23. The octagonal shape of the supply line openings 45 and 46 and of the position orientation flange 78 of each supply line connector assembly 60 allows the inlet leg 63 to be selectively and incrementally positioned in one of eight orientations relative to the back panel 23 in forty-five degree angle increments. If the finish plate 1 is mounted with the third edge 40 of the back panel 23 extending upward (as in FIGS. 1-6) then the inlet leg 63 and inlet connector 67 can be oriented to extend vertically upward or downward, horizontally to the left or right or at forty-five degrees, one hundred and thirty-five degrees, two hundred and twenty-five degrees or three hundred and fifteen degrees relative to vertical.

The supply line connector assemblies 60 in the embodiment shown are adapted for connection of a quarter turn, shut-off valve 101 thereto to form a water tight seal without the use of tools. In the embodiment shown, the valve 101 includes an exteriorly threaded female receiver 103 on an inlet of the valve 101. The outlet of the valve 101 includes a fitting 107 adapted to facilitate quick connection of a water supply line, such as hot or cold supply lines 13 and 15, between the valve 101 and a fixture, such as a sink and may comprise a compression fitting which can be tightened by hand to form a water tight seal. A knob or handle 108 on the valve 101 facilitates manual opening and closing of the valve 101 to control the flow of water to the fixture.

The male member 69 of the connector assembly 60 is sized for coupling with the inlet receiver 103 of a standard sized valve 101 with a portion of the tip 72 and the sealing member 73 extending into the receiver and the sealing member 73 abutting against outer edge of the receiver 103. The nut 70 can then be hand tightened onto the external thread of the valve inlet receiver 103 to compress the sealing member between the abutment 71 on the outlet leg 68 of the supply line connector assembly 60 and against the outer edge of the receiver 103 to form a water tight seal therebetween. It is foreseen that a wide variety of sealing type systems could be used for forming a seal between the male member 69 and the valve inlet receiver 103. For example, the sealing member could be an O-ring secured in a groove on the male member 69 and sized to snugly fit within the receiver 103 to form a water tight seal around an inner surface thereof. An alternative embodiment of a connector assembly 60' is shown in FIG. 8, It is foreseen that the conduit 62' could be formed as an assembly with for example, the inlet leg 63', bend. position orienting flange 78' and retention flange 80' formed as a first casting and the outlet leg 64' formed as a separate casting or length of tubing secured in a receiver in the first casting. The connector assemblies 60 and 60' could be formed from a wide variety of materials, including copper, plastic, brass, stainless steel or other metals or metal alloys.

In use, a plumber or installer can mount the finish plate 1 to studs 11 or brackets selected from a wide variety of existing types of brackets secured between studs 11 to support the finish plate 1 at a position to which it is connected to a drain line 7 and to facilitate the connection of hot and cold supply lines 3 and 5 thereto. In common plumbing practice, drain lines 7 are installed in a wall or stud bay before the supply lines 3 and 5. In an installation as shown in FIGS. 1-9, the drain line installers first install the vertical section of drain line 111 with a tee 112 having a hub 113 at the height where the drain line 7 is supposed to extend through the wall 9. The height is typically mandated by local building codes. The tee 112 separate the lower drain side and upper vent side. A stub-out assembly or trap adaptor 114 is secured in the horizontally extending hub 113 of the tee 112. The trap adaptor 114 is adapted to facilitate connection of the fixture drain line 17 to the drain line 111 in the wall.

The trap adaptor 114 includes a drain line stub out 116 and a cap 118 secured thereto. The stub-out 116 generally comprises a short section of conduit having an exteriorly threaded end 120 and a non-threaded end 121. The non-threaded end 121 is sized to be received in and glued to the drain line hub 113 with the threaded end 120 projecting outward therefrom. The trap adaptor cap 118 is interiorly threaded for threading onto the threaded end 120 of the stub-out 116 to permit pressure testing of the drain line 111 prior to connection of fixture drain line or p-trap 17 thereto.

The trap adaptor cap 118 includes a knock-out 123 integrally formed with a nut 124. The nut 124 includes a circumferential sidewall 125 and an inwardly projecting lip 126 which projects transverse to and radially inward from the sidewall 125 at a first end thereof. A thread 127 is formed on the inner surface of sidewall 125 and a plurality of projections 128 are formed on an outer surface of the sidewall 125 to facilitate hand threading of the nut portion 124 of the cap onto the threaded end 120 of the stub out 116. An annular ferrel 129 is integrally formed on and projects transverse to or inward from the lip 127 in spaced relation radially inward from the sidewall 126. An outer surface 130 of the ferrel 129 slopes outward from a tip of the ferrel 129 toward its base connected to the lip 127 and slowing toward the cap sidewall 126. The knock-out 123 is connected to the ferrel 129 by a thin, connecting web 132 extending between the base of the knock-out 123 and the base of the ferrel 129.

Portions of the knock-out 123 are similar in construction to the closure member or disk described in U.S. Pat. No. 6,769,291 of Julian et al. the disclosure of which is hereby incorporated by reference. Referring to FIGS. 10 and 11, the knock-out includes a circular disc or wall 134 with a peripheral rim 137 formed along a peripheral edge of the circular disc 134. The rim 137 extends outwardly from the outer surface of the disc 134. A lower outer edge of rim 137 is the portion of the knock-out 123 connected to the upper inner edge of the ferrel 129 by the relatively thin and weaker connecting web 132. The knock-out 123 can be separated from the nut 124 by striking the outer edge of the rim 137 with a hammer to shear the knock-out 123 from the nut 124. The outer diameter of the rim 137 of knock-out 123 is preferably sized to be larger than the inner diameter of the ferrel 129 so that the knock-out 123 will not be pushed back through the stub-out 116 and into the drain line 111 when separated from the nut 124. The rim 137 also functions to hold the knock-out 123 in a single piece so that it cannot fragment and fall through the drain line 111.

A hollow nipple 139 is formed in the circular disc 134 and opens through the circular disc 134. A breakaway nipple plug 140 of reduced diameter is connected to the nipple 139 by a weakened ring to facilitate separation of the nipple plug 140 from the nipple 139. The nipple 139 and nipple plug 140 are preferably cylindrical in shape, but other geometries may be utilized. Until removed, the nipple plug 140 covers an opening in the outer end of the nipple 139. The nipple 139, with the nipple plug 140 removed, provides structure for connecting a conduit (not shown) thereto. The conduit may then be used to deliver pressurized fluid to the drain line system for pressure testing. The nipple 139 and nipple plug 140 are shown as being located at the center of the knock-out disc 134. It is foreseen that the nipple axis could be radially offset from a center axis of the disc 134 to facilitate grasping the nipple 139 with a tool to assist in shearing the knock-out 134 from the nut 124 by pulling on the nipple 139.

The knock-out 123 is preferably removed after first removing the cap 118 from the stub out 116 and placing the cap on the floor so the rim 137 extends upward. Once the knock-out 123 is removed, the remaining nut portion 124 can be slid over the end of a fixture drain line 17 with the drain line 17 extending through the hole left where the knock-out 123 was removed and which is surrounded by the inner surface 136 of ferrel 129. The nut 124 is then threaded onto the threaded end 120 of the stub-out 116, the leading, inner edge of which engages the sloping outer surface 130 of the ferrel 129 compressing the ferrel 129 around the drain pipe 17 to form a seal. It is foreseen that a fixture drain line 17 could be glued directly into the hub 113 of tee 112 without use of a trap adaptor such as trap adaptor 114.

Prior to connection of the fixture drain pipe 17 to the drain line 111 using trap adaptor 114, the finish plate 1, with the supply line connector assemblies 60 mounted thereon may be set in place over the trap adaptor 114 or other stub out. The drain line opening 47 in finish plate 1 is aligned with trap adaptor 114 and then the finish plate 1 is pushed rearward over the trap adaptor 114. The drain line opening 47 in finish plate 1 is preferably sized larger than the trap adaptor cap 118 to slide over the cap 118 although it is foreseen that the installer may remove the cap 118 to facilitate pushing the finish plate 1 onto the stub out 116. The drain line opening 47 is also sized larger than the tee hub 113 so that the hub 113 may extend through the opening 47.

After the finish plate 1 is pushed over the trap adaptor stub out 116, brackets 142 may then be bolted or otherwise connected to the mounting flange 27 on the finish plate 1 and connected to studs 11 to secure the finish plate 1 in place in a desired orientation to facilitate connection of the supply lines 3 and 5 to connector assemblies 60 mounted on the finish plate 1. The finish plate 1 may be secured to the brackets 142 with fasteners extending through selected fastener holes 29 in the finish plate mounting flange 27 aligned with holes 143 in the brackets 142. The drain line opening 47 is sized to permit the finish plate 1 to be slid onto a drain line stub out 116 extending at an angle of roughly forty five degrees relative to the wall 9. It is also to be understood that one or more sides of the mounting flange 127 could be fastened to studs 11 or other framing members with nails screws or other fasteners.

The supply lines 3 and 5 typically will be plumbed to come into the stud bay above the drain line tee 112 and then extend downward on either side of the drain line 7. In such an installation, the finish plate will typically be oriented with the supply line openings 45 and 46 extending above the drain line opening 47. The connector assemblies 60 are then oriented so that the inlet legs 63 extend upward for receiving and connecting to the downwardly extending supply lines 3 and 5.

Figures 12, 13:
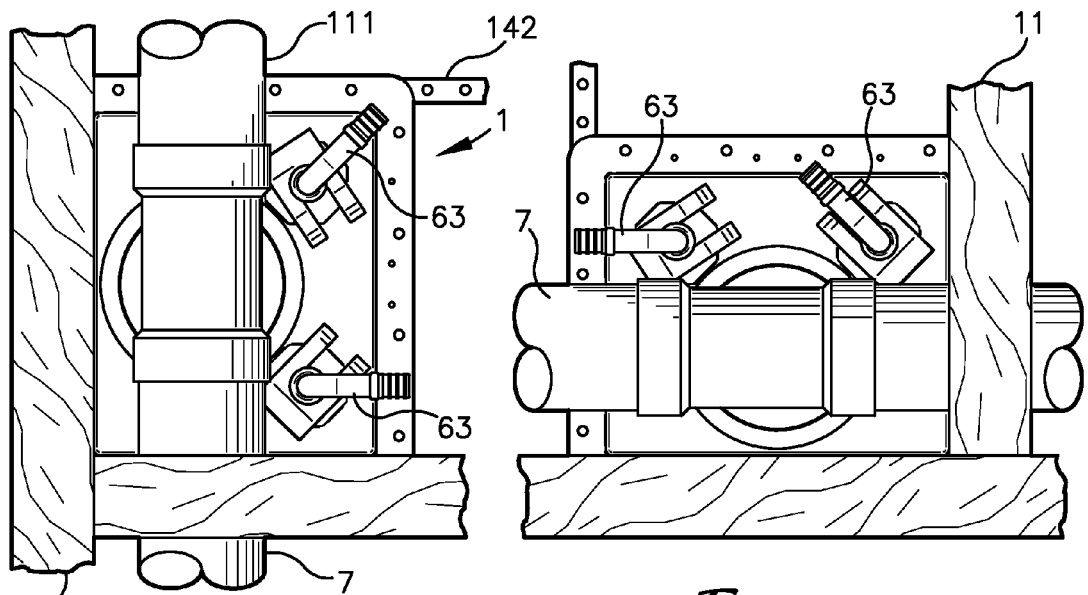
FIG. 12 is a fragmentary rear plan view showing the mounting panel and the inlet ends of the supply line connector assemblies oriented in an alternative orientation.
FIG. 13 is a fragmentary rear plan view showing the mounting panel and the inlet ends of the supply line connector assemblies oriented in an alternative orientation and with the drain line extending horizontally.

If for any reason it is more convenient to plumb one of the supply lines 3 or 5 to approach the finish plate 1 at a forty five degree angle, the supply line connector assembly 60 to which the angled supply line 3 or 5 is to be attached can be oriented as discussed above so that the inlet leg 63 extends at a forty five degree angle relative to vertical or horizontal. If the installation favors extending the supply lines 3 and 5 from below, the finish plate 1 can be mounted with the supply line openings 45 and 46 positioned below the drain line opening 47 and the supply line connector assemblies oriented so that the inlet legs 63 extend downward for receiving the upwardly extending supply lines 3 and 5. Similarly, if the installation favors plumbing the supply lines 3 and 5 to approach the finish plate from either side, the finish plate 1 can be oriented so that the supply line openings 45 and 46 are positioned to one side of the drain line opening 47 and the supply line connector assemblies 60 could be oriented with the inlet legs 63 extending to the side or offset forty-five degrees from horizontal as generally shown in FIG. 12. If the installation favors plumbing one of the supply lines 3 from above and the other supply line 5 from below, the supply line connector assemblies 60 can be oriented with the inlet leg 63 of one extending upward and the inlet leg 63 of the other extending downward. It is also foreseen that if desired, the finish plate 1 could be mounted at any angle relative to the plane of the wall 9. FIG. 13 shows an installation in which the drain line 7 extends horizontally.

During installation, the orientation of the inlet leg 63 of each connector assembly 60 can be relatively quickly re-oriented to face any one of the eight possible directions, by removing the retention clip 62, pulling the connector assembly 60 forward enough to pull the position orienting flange 78 out of the mating supply line opening 45 or 46, rotating the connector assembly 60 to the desired orientation then re-seating the position orienting flange 78 against shoulder 55 in the supply line opening 45 or 46 and then reinserting the clip 82 between the rear face 32 of the panel 23 and the retention flange 80 on the connector assembly 60. It is foreseen that the bowed portion 90 of the retention clip 82 can be designed with sufficient give to permit an installer to pull forward on the connector assembly 60 to unseat the position orienting flange 78 from the supply line opening 45 or 46, rotate the connector assembly 60 to the desired orientation and then allow the biasing force of the bowed portion 90 of clip 82 to draw the position orienting flange 78 back into seated engagement against the shoulder 55 in the supply line opening 45 or 46. It is to be understood that the orientation of the supply line connector assembly 60 generally is not intended to be adjusted once a supply line 3 or 5 is connected thereto.

The drain line opening 47 and over-molded drain line seal 49 is sized large enough to accommodate not just the branch of the drain line 7 to connect to the fixture, but also the hub of a drain line tee from which the branch extends. This flexibility is important as in some cases the drain line 7 may be plumbed such that the hub of the tee is positioned so that it will extend through the wall 9. The drain line opening and over-molded seal 49 are also sized large enough to accommodate drain line branches extending through the wall at forty five degrees to connect to offset lavatory sinks which are not uncommon, particularly in selected jurisdictions.

After connection of the supply lines 3 and 5 to supply line connectors 60, valves 101 can be connected to the outlet connectors 68 to permit pressure testing of the supply lines 3 and 5 before installation of the wall board 10 to facilitate fixing any leaks that would otherwise be covered by the wall board 10. If the installer prefers not to install the valves 101 during such pressure testing, an externally threaded cap 144 can be threaded into the nut 70 of the outlet connector 68 and against the sealing member 73.

Wall board 10 is generally installed over the finish plate 1 after pressure testing of both the drain line 7 and supply lines 3 and 5 but before connection of the fixture thereto. Prior to placement of the wall board 10, a hole sized just larger than the circumferential rim 25 is cut in the wall board 10 to accommodate the finish plate 1 when the wall board 10 is installed.

Figure 14:
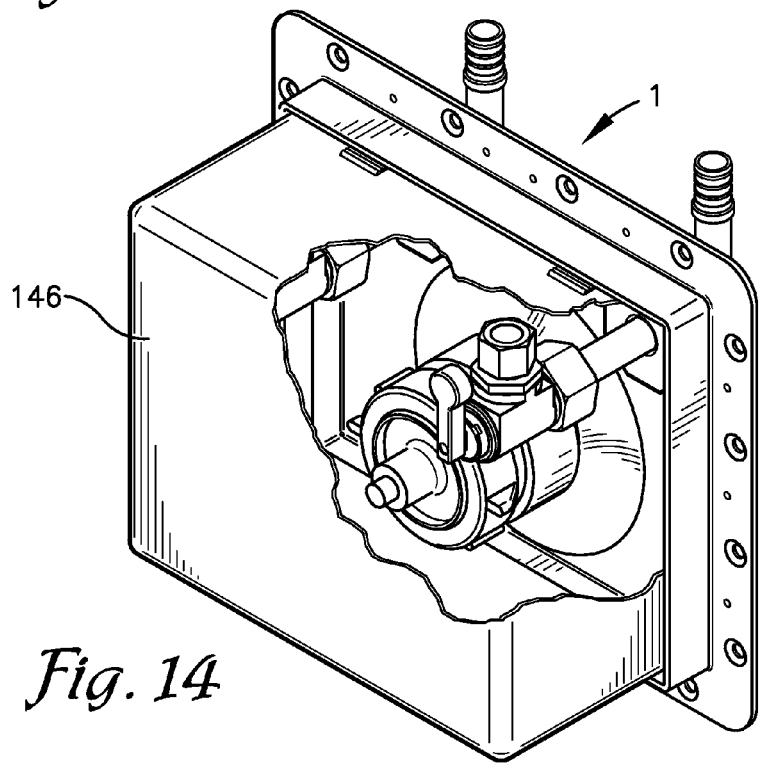
FIG. 14 is a perspective view of the access panel assembly having a cover secured thereto with portions broken away to show detail.

A plurality of pawls 145 (one shown in FIG. 9) are molded into or formed on an inner surface of the rim 25 of the finish plate 1 and project inward therefrom for use in connecting a protective cover 146 or a finish frame 147 to the finish plate 1. The protective cover 146 as shown in FIG. 14, generally comprises a box open on one side and having a depth sufficient to receive the portion of the supply line connector assemblies 60 and the valves 101 and the capped, drain line stub out 114 extending into the room past the back panel 23 of the finish plate 1. The protective cover 146 may be formed from a wide variety of materials, including plastic, metal or cardboard and may include a hole in a front panel thereof to permit a relatively long drain line stub out to extend therethrough if necessary. The protective cover 146 may be installed after the finish plate 1 is initially bracketed in place to prevent damage by other construction workers in the building who for example might try to stand on the drain line trap adaptor 114 or accidentally kick or engage the stub trap adaptor 114 while working in the vicinity. Once the supply lines 3 and 5 are connected to the connector assemblies 60 and the valves 101 are attached thereto, the cover 146 can be reattached to protect the valves 101, connector assembly outlet leg 64 and trap adaptor 114 from damage from workers or from getting painted if the room is painted before installation of fixtures.

Figure 15:
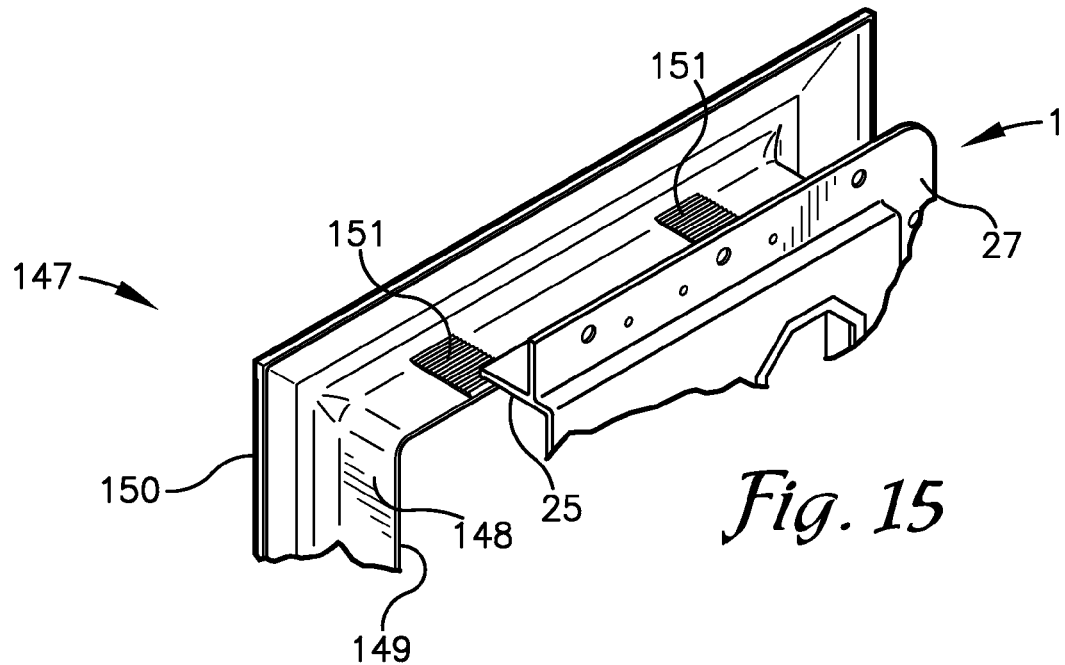
FIG. 15 is a fragmentary and exploded rear perspective view showing a decorative finish panel secured to the mounting panel.
Figure 16:
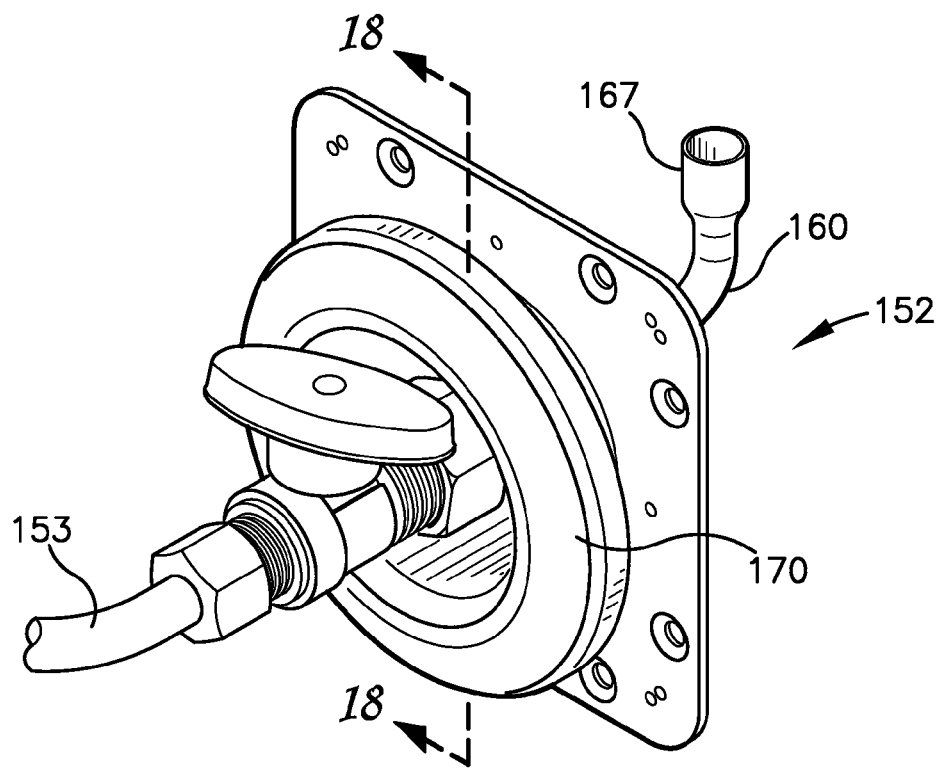
FIG. 16 is a perspective view of an alternative embodiment showing a supply line access panel assembly having a mounting panel with a supply line connector assembly secured in a single supply line opening in the access panel.
Figure 17:
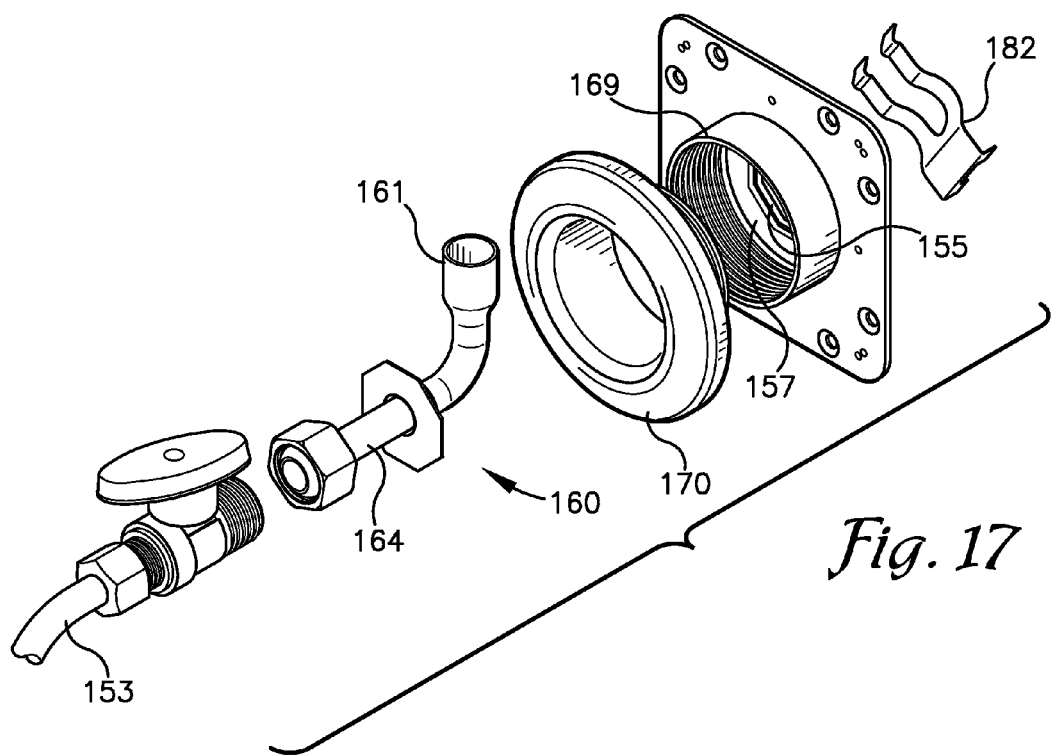
FIG. 17 is an exploded perspective view of the supply line access panel assembly as in FIG. 16.
Figure 18:
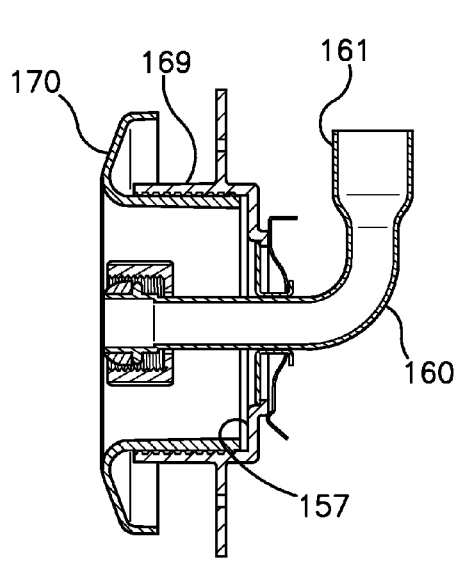
FIG. 18 is a cross-sectional view taken along line 18-18 of FIG. 16.
Figure 19:
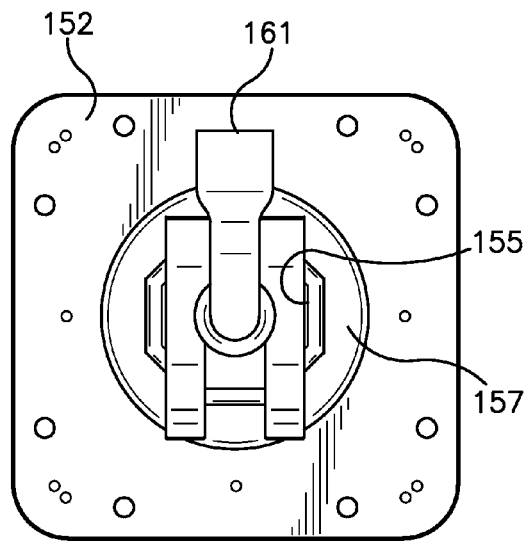
FIG. 19 is a rear plan view of the supply line access panel assembly as in FIG. 16.

The finish frame 147, as best seen in FIGS. 1, 5 and 15, is adapted to cover the gap between the finish plate rim 25 and the wall board 10 and present a clean looking finish around the edges of the finish plate 1. Finish frame 147 includes a frame collar or sleeve 148 defining a frame opening 149. A flange or fascia 150 extends outward around the periphery of the frame collar 148. The frame collar 148 is are sized to fit just inside the rim 25 of the finish plate 1. Ratchet strips 151 are formed on the outer surface of the collar 148 and positioned to engage the pawls 145 formed on the rim 25 which engage the aligned ratchet strips 151 to secure the finish frame 147 to the finish plate 1 with the fascia 150 extending over the rim 25 and the adjacent portion of wall board 10 covering the gap therebetween.

After the finish frame 147 is installed, finish plumbers can then connect the fixture supply lines 13 and 15 to the valves 101, thereby connecting the supply lines 13 and 15 to supply lines 3 and 5 in the stud wall 9. Similarly, and as discussed previously, fixture drain pipe 17 can be connected to the drain line 7 by removing the cap 118 from the trap adaptor stub out 116, separating and removing the knock-out 123, installing the remaining nut 124 of cap 118 onto an end of the fixture drain pipe 17 and then threading the nut 124 back onto the threaded end 120 of trap adaptor stub-out 116. If after installation, a valve 101 fails, it is relatively easy to remove and replace as the nut 70 connecting the supply line connector assembly 60 to the valve inlet receiver 103 is adapted for hand tightening as is the fitting 107 connecting the fixture supply line 13 or 15 to the valve outlet.

The flexible elastomeric seal 49 surrounding the trap adaptor stub-out 116 or the drain tee hub 113 forms a seal therearound to prevent water from migrating along the outside of the stub out 116 and behind the wall board 10. The seal 49 also presents a relatively clean appearance covering the gap between the trap adaptor stub out 116 and the drain line opening 47 in the finish plate 1. The seal 49 also reduces the ability of pests or vermin to enter the room through such a gap.

Referring to FIGS. 16-19 there is shown an alternative finish plate and connector assembly 152 for connecting a single supply line 3 to a single fixture supply line such as a toilet supply line 153. The assembly 152 may be referred to as a finish plate 152 and is similar in many respects to finish plate 1 except that finish plate 152 includes only a single, octagonal, supply line opening 155 formed in a round back panel 157 with no drain line opening formed therein. The supply line opening 155 is adapted to receive a supply line connector assembly 160 similar to and interchangeable with the connector assemblies 60 used with finish plate 1. A clip 182 is used to connect the supply line connector assembly 160 to the finish plate 152. In the embodiment shown, the outlet leg 164 of the connector assembly 160 is longer than the outlet leg 64 of connector assembly 60 and the inlet connector 167 of assembly 160 is shown as a different type of connector compared to inlet connector 67 of assembly 60. Inlet connector 167 is shown as a PEX type connector. A circular rim 169 surrounds the back panel 160 and is internally threaded. A circular cover frame 170 with an external thread can be threaded into rim 169 to present a clean finish.

It is to be understood that while certain forms of the present invention have been illustrated and described herein, it is not to be limited to the specific forms or arrangement of parts described and shown. As used in the claims, identification of an element with an indefinite article "a" or "an" or the phrase "at least one" is intended to cover any device assembly including one or more of the elements at issue. Similarly, references to first and second elements is not intended to limit the claims to such assemblies including only two of the elements, but rather is intended to cover two or more of the elements at issue. Only where limiting language such as "a single" or "only one" with reference to an element, is the language intended to be limited to one of the elements specified, or any other similarly limited number of elements.

Having thus described the invention, what is claimed as new and desired to be secured by Letters Patent is as follows:

1. A plumbing finish plate assembly for covering an opening in a wall panel through which water supply lines and a drain line extend, said finish plate assembly comprising:
   a) a mounting panel having a drain line opening and two supply line openings formed therethrough; said drain line opening being larger in diameter than said supply line openings;
   b) a circumferential sidewall extending around a periphery of said mounting panel and projecting forward therefrom;
   c) a mounting flange projecting outward and transverse to said circumferential sidewall such that a portion of said circumferential sidewall extends forward from said mounting flange a distance at least as deep as the thickness of conventional wallboard; and
   d) a flexible, elastomeric, annular drain line seal, having a central opening extending therethrough which is smaller in diameter than said drain line opening; said annular drain line seal connected to and secured to said mounting panel around said drain line opening for sealing around a drain pipe extending through said drain line opening in said mounting panel and through said annular drain line seal; and
   e) a supply line connector assembly securable to said mounting panel through each of said supply line openings; each said supply line connector assembly comprising an elbow shaped conduit having an inlet supply line connector on an inlet end of an inlet leg thereof and an outlet supply line connector on an outlet end of an outlet leg thereof; said inlet leg extending generally perpendicular to said outlet leg.

2. The plumbing finish plate assembly as in claim 1 wherein said mounting panel is rectangular and has first and second transverse centerlines and said drain line opening is centered about said first centerline of mounting panel and offset to a first side of said second centerline of said mounting panel, and said first and second supply line openings are positioned on opposite sides of said first centerline and on a side of said second centerline opposite said drain line.

3. The plumbing finish plate assembly as in claim 1 further comprising:
   a) securement means for selectively securing each said supply line connector assembly to said mounting panel such that said outlet leg of said elbow extends axially through said respective supply line opening.

4. The plumbing finish plate assembly as in claim 3 wherein said securement means includes orientation means for selectively orienting said supply line connector assembly in at least four increments of ninety degrees relative to said mounting panel.

5. The plumbing finish plate assembly as in claim 4 wherein said securement means further comprises a clip removably positionable between said mounting panel and a retention member projecting from said outlet leg of said supply line connector assembly.

6. The plumbing finish plate assembly as in claim 4 wherein said orientation means includes:
   a) a position orienting flange projecting radially outward from said outlet leg of said supply line connector assembly;
   b) a flange support shoulder formed on said mounting panel around said supply line opening; and
   c) said position orienting flange and said flange support shoulder having mating geometries.

7. The plumbing finish plate assembly as in claim 6 wherein said position orienting flange and said flange support shoulder each have at least four sides.

8. The plumbing finish plate assembly as in claim 6 wherein said position orienting flange and said flange support shoulder each have eight sides.

9. The plumbing finish plate assembly as in claim 1 further comprising a supply line connector assembly securable to said mounting panel through each of said supply line openings; each said supply line connector assembly comprising an elbow having an inlet supply line connector assembly comprising an elbow having an inlet supply line connector on an inlet end of an inlet leg thereof and an outlet supply line connector on an outlet end of an outlet leg thereof; said inlet leg extending generally perpendicular to said outlet leg.

10. A plumbing finish plate assembly for covering an opening in a wall panel through which at least one water supply line and a drain line extend, said finish plate assembly comprising:
   a) a mounting panel having a drain line opening and at least one supply line opening formed therethrough; said drain line opening being larger in diameter than said supply line openings;
   b) a circumferental sidewall extending around a periphery of said mounting panel and projecting forward therefrom;
   c) a mounting flange projecting outward and transverse to said circumferential sidewall such that a portion of said circumferential sidewall extends forward from said mounting flange a distance at least as deep as the thickness of conventional wallboard;

d) a flexible, elastomeric, annular drain line seal, having a central opening extending therethrough, connected to and secured to said mounting panel around said drain line opening for sealing around a drain pipe extending through said drain line opening in said mounting panel and through said annular drain line seal; and e) a finish frame having a fascia; said finish frame removably securable to said mounting panel so that said fascia extends over an outer edge of said circumferential sidewall of said mounting panel to cover a gap formed between said outer edge of said circumferential sidewall of said mounting panel and an inner edge of an opening in the wall across which said mounting panel is installed.

* * * * *